March 27, 1945.  H. PLETMAN  2,372,392
CHARGED LIQUID DISPENSING DEVICE
Filed May 28, 1940  3 Sheets-Sheet 1
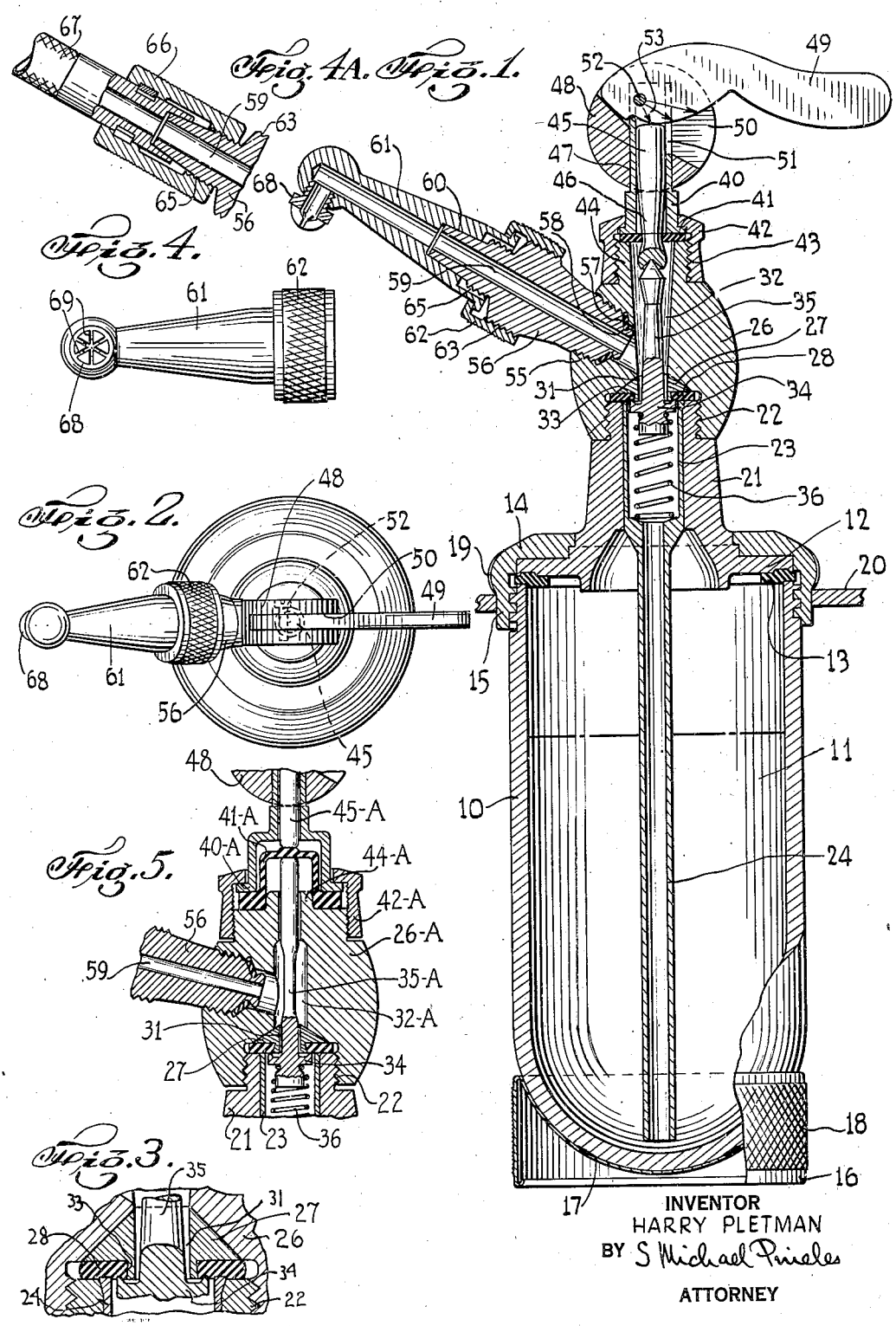
INVENTOR
HARRY PLETMAN
BY S Michael Pineles
ATTORNEY March 27, 1945. H. PLETMAN 2,372,392
CHARGED LIQUID DISPENSING DEVICE
Filed May 28, 1940 3 Sheets-Sheet 2
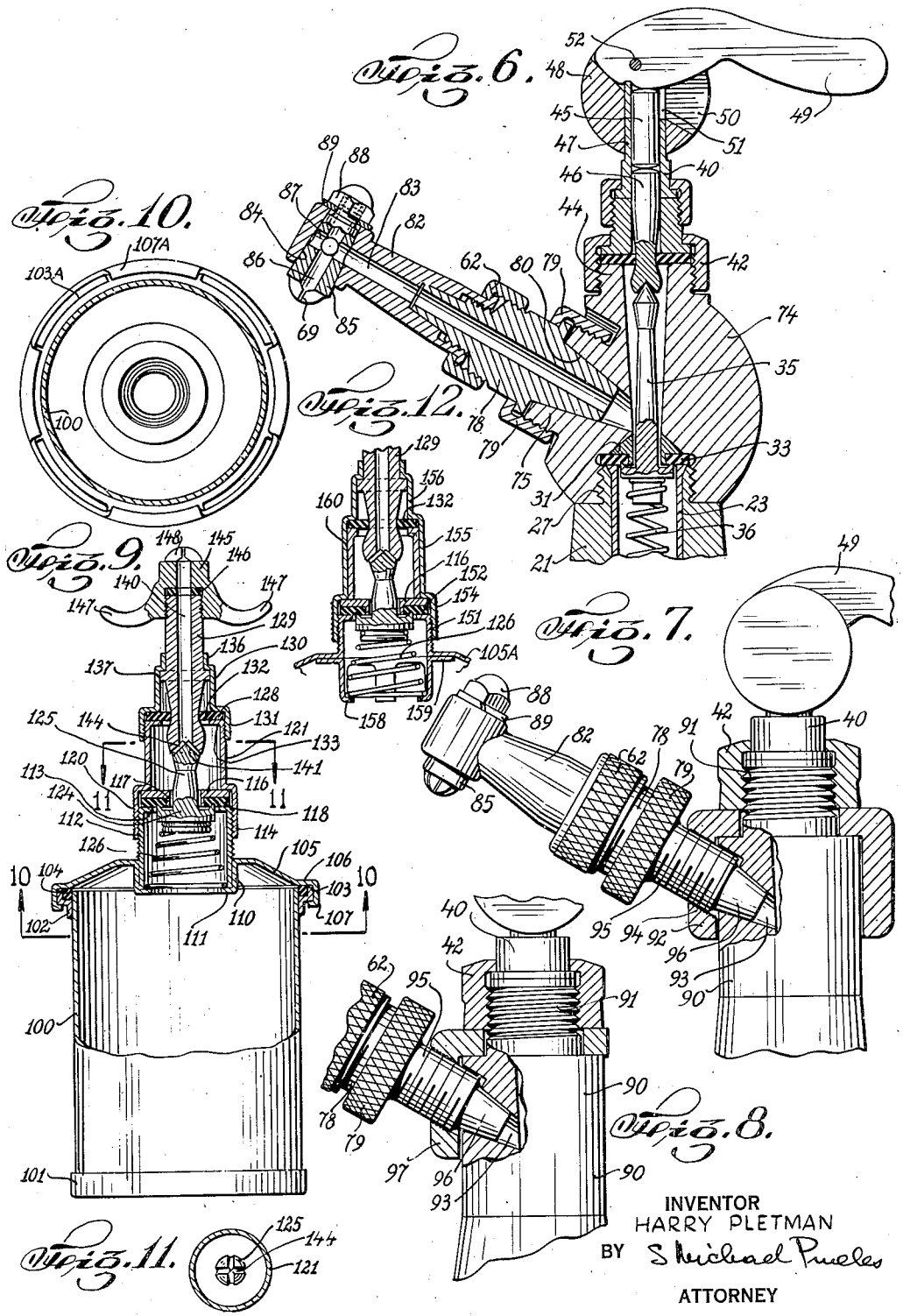
INVENTOR
HARRY PLETMAN
BY S. Michael Pueles
ATTORNEY March 27, 1945. H. PLETMAN 2,372,392
CHARGED LIQUID DISPENSING DEVICE
Filed May 28, 1940 3 Sheets-Sheet 3
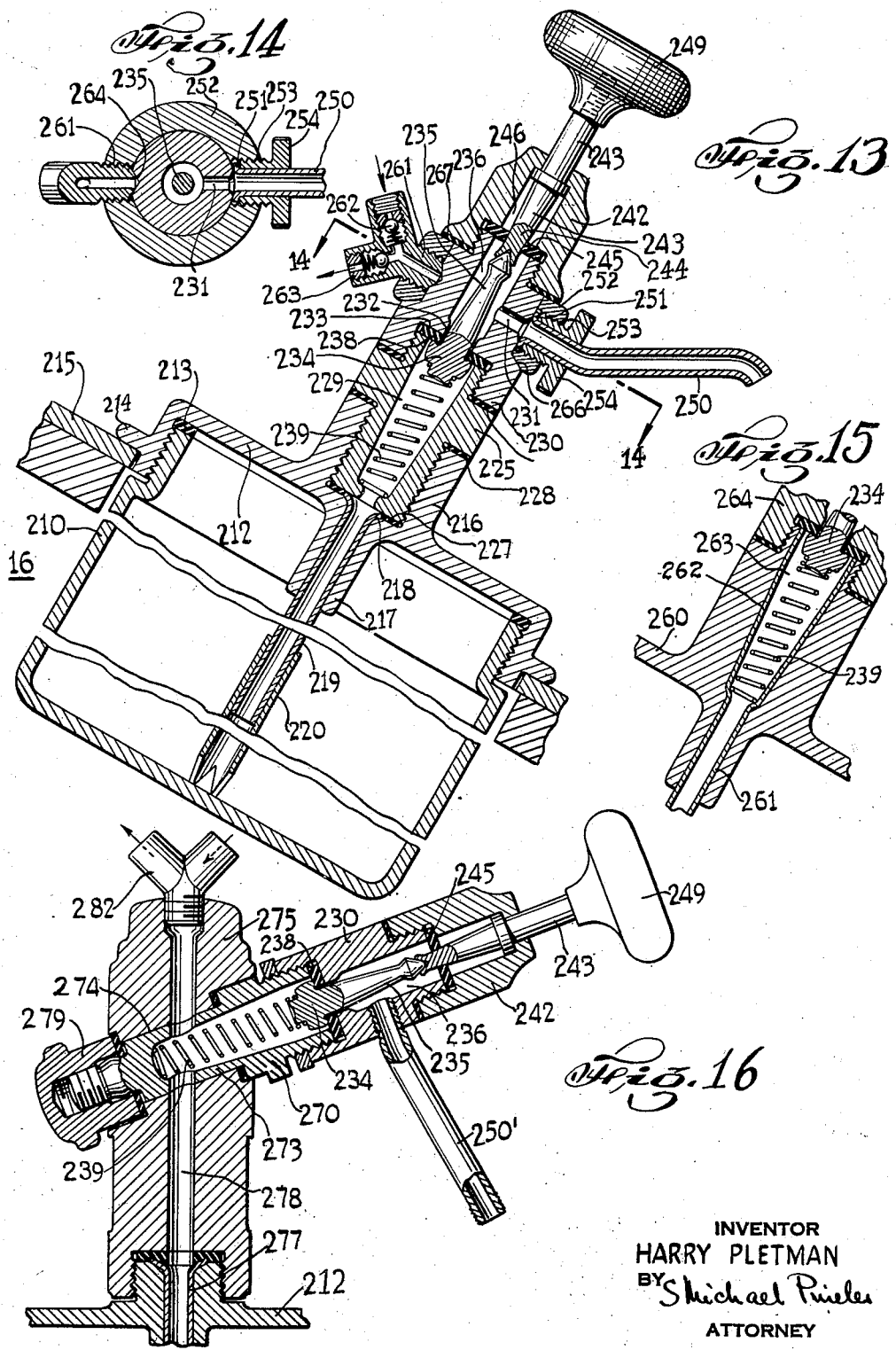
INVENTOR
HARRY PLETMAN
BY Michael Prieler
ATTORNEY Patented Mar. 27, 1945

2,372,392

UNITED STATES PATENT OFFICE 2,372,392

CHARGED LIQUID DISPENSING DEVICE

Harry Pletman, Brooklyn, N. Y., assignor, by direct and mesne assignments, of seventy per cent to Harry Kornreich, Brooklyn, and thirty per cent to S. Michael Pineles, New York, N. Y.

Application May 28, 1940, Serial No. 337,683

16 Claims. (Cl. 99—264)

This application is a continuation-in-part of my application Serial No. 169,478, filed October 16, 1937. This invention relates to charged liquid dispensing devices, and it is particularly concerned with devices for dispensing liquids requiring sanitary handling, such as whipped cream, ice cream or the like.

It is among the objects of the invention to provide an improved sanitary liquid dispensing device of such type which has simple and accessible parts that may be readily disassembled and maintained in sanitary condition and enable converting in an effective manner the liquid charged with a compressed gas into a fluffy substance in the course of the dispensing process, while maintaining the charged liquid in a highly sanitary condition.

The foregoing and other objects of the invention will be best understood from the following description of exemplifications thereof, reference being had to the accompanying drawings, wherein Fig. 1 is a vertical cross-sectional view of a complete whipped cream dispensing device exemplifying one form of the invention;

Fig. 2 is a top view of the device of Fig. 1;

Fig. 3 is a detailed sectional view of the valve closure elements of the device;

Fig. 4 is a bottom view of the dispensing nozzle of Fig. 1;

Fig. 4A is a sectional view illustrating the coupling connection of the outlet duct of the device to a hose leading from a compressed gas source;

Fig. 5 is a view similar to Fig. 1 illustrating another valve arrangement exemplifying the invention;

Figs. 6, 7 and 8 illustrate different forms of a modified arrangement for coupling the discharge duct to the valve housing of the device shown in Fig. 1;

Fig. 9 is a view similar to Fig. 1 illustrating another form of device exemplifying the invention;

Fig. 10 is a cross-sectional view along line 10—10 of Fig. 9;

Fig. 11 is a cross-sectional view along line 11—11 of Fig. 9;

Fig. 12 is a cross-sectional view similar to Fig. 9 illustrating another exemplification of a valve unit of the invention;

Fig. 13 is a view similar to Fig. 1 illustrating a further form of a dispensing device exemplifying the invention;

Fig. 14 is a cross-sectional view of the valve unit of Fig. 13 along line 14—14 of Fig. 13;

Fig. 15 is a cross-sectional view of the form of cover for a device such as shown in Fig. 13; and Fig. 16 is a view similar to Fig. 13 illustrating another exemplification of the invention.

Although whipped cream is a standard article dispensed at almost all soda fountains, no satisfactory dispensing devices suitable for fountain use and able to convert stored liquid cream into whipped cream by a single dispensing operation have been available. As a result, most fountains store the cream in whipped form and dispense it in such form from the container in which it is stored.

There are many objections against such practice. In order to produce whipped cream of the required consistency by the common agitating process, the cream must be of a suitable low temperature and it has to have a relatively high percentage of butter fat. In addition, it must not be too old nor too fresh as otherwise it will not whip satisfactorily or the agitation will produce butter instead of whipped cream.

This practice is also objectionable because whipped cream once produced collapses after a certain period of time and it is very difficult to whip it again.

Since cream for making whipped cream is, like milk, a good breeding substance for bacteria, a satisfactory dispensing device for converting the cream into whipped cream must not only be able to convert the creamy liquid into a frothy mass of the required consistency, but it must also protect the dispensed cream against contamination and deterioration.

Furthermore, all parts of such dispensing device which come in contact with the cream must lend themselves for ready cleaning and must be so arranged as to prevent incrustation of layers of cream and the clogging up of the passages or cavities of the dispensing device, particularly since the compressed gas tends to force small quantities of cream into crevices into which it would otherwise not enter.

The dispensing device of the invention overcomes these difficulties and permits the conversion of cream or cream-like liquids into a stable, fluffy froth by an easily controlled simple operation. In addition, all the parts of the dispensing device are simple, readily accessible and are so arranged and shaped as to permit easy, thorough cleaning of all the parts.

Although the device of the invention was developed primarily in order to provide a satisfactory whipped cream dispensing appliance for soda fountains and similar service, it also lends itself for many other applications, such as the conversion of a liquid ice cream preparation into a semi-solid ice cream.

By the device of the invention, ordinary milk cream, even if stored for a prolonged period, and though poor in butter fat, is converted into about 3½ or more times its original volume, without loss of its sweetness and tastiness, by charging with a neutral compressed gas and converting the charged liquid into a frothy mass during the dispensing operation.

Dispensing devices designed in accordance with the principles of the invention described hereinafter are ideally suited for converting, in the course of the dispensing operation, various liquids and semi-liquid fluids, such as liquid cream, whether poor or rich in butter fat, liquid ice cream or custard mixtures or the like, requiring sanitary handling, into a gas-expanded highly palatable product of greatly increased volume.

An exemplification of the invention suitable for mounting on the rack of a soda fountain, or the like, is shown in Figs. 1 to 5. A creamy liquid, such as cream, is stored in a pressure resistant cylindrical container 10 which is open at its upper end and is enclosed by a cover plate 12 clamped over a packing ring 13 of suitable packing material, such as rubber, by a clamping collar 14 having a threaded flange 15 engaging the threaded outer edge portion of the container 10 so as to provide a pressure-tight joint between the cover plate 12 and the container 10. The threads on the engaging portions of the container 10 and the cover 12 are of the type known in the trade as milk threads, being rounded and of relatively large pitch, so as to enable thorough and easy cleaning of all thread surfaces and prevent formation of cream encrustations thereon. By unscrewing the clamping collar, the packing washer 13 may be readily removed and all the surfaces of the container 10, the cover 12, the clamping collar 14 and the washer 13 may be easily scrubbed and cleaned. All other threaded joints of the device hereinafter described are as far as feasible, likewise provided with milk threads.

For ease of handling, the rounded bottom of the container is provided with a base 16 having an inner portion 17 secured as by spot welding, to the container bottom and cylindrical ring portion 18 of the container. The outer surfaces of the clamping collar 14 and the bottom ring 18 are knurled to facilitate tight clamping and taking apart of the container, the knurled portion of the clamping collar 14 serving also to hold the container 10 in position on the wall 20, of a soda fountain, for instance.

The cover plate 12 has an upwardly projecting hollow neck portion 21 having a threaded junction portion 22 in which is mounted the wider upper end portion 23 of a tubular supply duct 24 constituting a supply passage portion extending to near the bottom of the container 10. The upper portion 23 of the supply duct 24 forms an inlet passage to a valve casing member 26 having a valve seat member 27 and an internally threaded junction portion which is tightly coupled to the threaded neck junction 22 and the valve inlet passage 23 of the supply duct 24, a packing washer 28, of suitable packing material, such as rubber, being interposed between the facing junction surfaces.

The valve casing 26 has a valve opening 31 which opens into a discharge chamber 32. In accordance with the invention, the wall portion of the valve casing 26 which borders the inlet side of the valve opening and serves as the valve seat is made in the form of a detachable valve seat member 27, shown in detail in Fig. 3. The valve seat member 27 has a downwardly projecting neck portion 33 having an outwardly tapering outer surface forming a recess in which the packing washer 28 is retained, so that when the portion of the packing ring 28 overlying the valve seat is compressed, its yielding material will not be pushed inwardly into the valve opening 31 and thus prevent its deformation.

As shown in Fig. 3, the valve seat member 27 has an outer surface detachably fitting a correspondingly shaped opening surface of the valve casing, the interfitting surfaces being shaped so that in dis-assembling the valve casing, the valve seat member 27 together with the packing washer 28 retained thereon will be quickly removed for cleaning and scrubbing while assuring that when the valve casing is assembled, the valve seat member 27 with its packing ring 28 will be held tightly clamped in their position within the valve casing by the threaded junction portion 22 of the container neck 21. The packing washer 28 serves thus not only to provide a tight valve seat, but also to provide a tight junction between the valve seat member 27 and the valve casing 26 as well as between the valve casing 26 and the container 10 with its supply duct 24.

The valve opening is arranged to be closed by a valve member 34 and a stem 35 extending into a valve chamber 32. The valve member 34 is suitably biased to its closed position, shown in Fig. 1 as by a helical spring 36 which presses the valve member 34 against the portion of the packing ring 28 which borders the collar 33 of the valve seat member 27. A valve closure member 40 is held clamped to the upper open end of the valve chamber 32 over a packing ring 41, by means of a clamping collar 42 having an inner threaded surface 43 engaging the threaded upper end portion 44 of the valve casing 26 so as to provide a tight joint between the closure member 40 and the valve casing 26. A valve operating rod 45 is slidably mounted within a cylindrical opening of the valve closure member 40 and has a downwardly projecting portion 46 extending through a tight hole in the packing ring 41 into engagement with the upper end of the valve stem 35 so that by pushing down the operating rod 45, the valve closure member 34 gradually opens the valve opening in a way more fully described hereinafter.

In accordance with the invention, penetration of liquid into the space within the valve closure member 40 is made impossible by providing the valve operating rod 45 with a tapered outer surface which is so shaped that as it moves inwardly to open the valve member 34, it automatically increases the pressure between its surface and the surrounding surface of the packing ring 41 and thereby increases the tightness of its fit to positively prevent entrance of liquid between the interfitting surfaces of the valve rod and the packing ring.

Easy and controllable manipulation of the operating rod is secured by mounting on the slotted upper cylindrical portion 47 of the valve closure member 40 a slotted handle support 48 in which is pivotally mounted a handle 49, for movement in the slots 50 of the handle support 48 and the closure portion 47 so as to push the valve operating rod 45 in downward direction as the handle 49 is tilted downwardly. The pivotal support of the handle is formed by a stud 52 which, as shown in Fig. 2, extends through one side wall of the handle support 48 and the side walls of the slotted valve closure portion 47, and holds all elements in their operating position by the threaded engagement of its threaded end with a side wall of the slotted handle support 48.

The valve casing 26 has also a valve outlet passage 55 in which is mounted an outlet member 56 having an inward portion threadedly engaging the surface of the valve outlet passage 55, a washer 57 of suitable packing material, such as rubber, being retained in a grooved end portion 58 of the valve outlet member to provide a tight coupling junction when mounted in its position shown in Fig. 1, while assuring that the packing washer 57 is removed when the outlet member 56 is uncoupled from the valve casing 26.

The valve outlet member 56 has a tapered outer end portion 60 for seating a correspondingly shaped surface of a discharge nozzle 61, the tapered junction surfaces having an angle which assures a tight seat of the nozzle member 61 on the tapered end of the outlet member 56. If desired, an additional clamping collar 62 having a threaded engagement with the threaded portion 63 of the outlet member 56 may be utilized for firmly clamping the nozzle 61 to the outlet member.

The outlet member 56 of the valve casing 26 is also provided with an intermediate threaded coupling portion 65 for mounting thereon the coupling collar 66 provided at the end of a hose 67 leading from a source of compressed gas, such as a compressed gas bottle, not shown, to permit easy charging of the container with gas up to the desired pressure, as indicated on a manometer mounted on the gas bottle. The outlet nozzle 61 may also be provided with a decorator nipple 68 having a slotted discharge outlet 69 for discharging the whipped cream in a suitable decorative form.

In using a dispensing device of the type shown in Figs. 1 to 4 for dispensing whipped cream, the container is filled with a quantity of cream and charged with a compressed gas of a pressure of the order of about 75 pounds per square inch. As a result, serious troubles are encountered when operating the valve to release cream charged with the gas, because under the relatively high gas pressure the discharge is difficult to control, and it often assumes an explosive character. Such explosive discharges are troublesome, not only because they waste the relatively expensive ingredient, such as cream, but also because the additional care and labor required in attending to the dispensing operations makes it very objectionable.

In accordance with the invention, the valve stem 35 and the facing portion of the valve opening 31 are so shaped and proportioned that in the closed position of the valve, the valve opening 31 forms a narrow substantially parallel passage which is gradually reduced in length and converted into a gradually widening expansion nozzle as the valve stem 35 is moved from the closed position to open position so as to gradually increase the rate at which charged liquid enters the valve opening passage and is expanded into a frothy mass discharged into the valve outlet passage. The ease of operation permits controlled discharge and distribution of whipped cream and makes possible fine decorative effects.

In normal operation, when used, for instance, on a fountain, the container 10 is filled with a quantity of whipped cream or another liquid leaving a free space above the level of the liquid. The container is charged with gas of the required pressure from a gas bottle, and the gas is distributed throughout the liquid, filling also the space above the level of the liquid. To dispense cream, the valve actuating rod 45 is pressed inwardly to actuate the valve member 34 from its closed position to open positions against the pressure of the gas and the spring 36. The inward movement of the valve closure member 34 brings the tapered portion 35 of the valve stem gradually into the valve opening 31 and forms with the adjacent walls of the opening an annular expansion nozzle which is gradually enlarged as the valve stem moves inwardly.

As explained above, the portion of the valve stem which in the closed position faces the adjacent walls of the valve opening 31 is substantially parallel to the walls and only the portions of the stem which enter into the wall openings 31 in the course of its downward motion are tapered so that in the initial part of the downward motion of the valve stem 35 substantially no cream can be discharged into the valve chamber 32. Only in the further course of the inward motion of the valve stem 35 does the tapered nozzle sufficiently widen the discharge space between its outer surface and the bordering discharge opening 39 as to form therewith an expansion nozzle for releasing the cream which is charged with compressed gas and converting it by expansion into the valve chamber 32 into a frothy mass of whipped cream. As a result, the rate at which the frothy conversion product is discharged from the discharge nozzle may be easily regulated and the discharge of the whipped froth formed by the liquid is only gradually started. Explosion-like discharges of large masses of whipped cream, that might be caused by an abrupt dispensing operation, is thus prevented by the provision of a narrow valve passage between the side walls of the valve inlet opening 31 and the facing walls of the valve stem 35 so that only when the valve stem is pressed sufficiently far down it reduces the length of the narrow valve passage and gradually changes it into a gradually widening expansion nozzle which brings about the expansion of the charged liquid and the formation of the creamy froth in the valve chamber 32. By suitably adjusting the size and configuration of the supply passage 31, the chamber opening 32 and the valve closure member 34 with its stem 35, the downward movement of the actuating rod may be correlated with the rate in which a creamy liquid is converted into a frothy mass discharged from the valve.

This arrangement secures a controllable flow of whipped cream as it is being dispensed and makes it easy for the operator to dispense the exact amount of cream desired. It also prevents sudden explosive discharges and waste of cream. In actual operation experience with the valve arrangement of the type described above, it is found that the use of such improved valve arrangement of the invention enables the reduction of the cream consumption in the average store counter by about half.

In addition, the special valve seal collar 33 between the flexible valve seat packing ring 28 and the valve opening 31 makes it impossible to force yieldable packing material of the packing ring 28 into the space of the valve opening. As a result, the valve opening may be designed to permit controllable discharge of the compressed liquid while assuring at all times perfect and satisfactory operation of the dispensing device and eliminating troubles due to obstructions of the valve opening or swelling of the packing ring.

All the elements of the valve assembly may be readily taken apart and washed with boiling water at the end of the day and cleaned from any remnants of cream or other creamy liquids requiring sanitary handling. All passages in the valve are simple and straight, and may be readily scrubbed with a brush. All elements of the device are free from crevices on which encrusted particles of cream might form and any encrustations formed on any surface of the device are visible to the naked eye and may be easily removed. Danger of contamination of the cream or milk is thus eliminated.

In taking apart the valve structure, the clamping collar 19 is unscrewed from the container 10, the valve casing 26 is unscrewed from the neck 21 of the cover plate, the outlet member 56 is unscrewed from the valve casing and the outlet nozzle and the valve closure member 42 are similarly taken apart exposing the interior of each of the elements and permitting easy removal of all packing washers and rings and the scrubbing of all parts. All threaded portions which come into contact with the cream or milk have large milk threads which are easy to keep clean and formation of hidden encrustations is thus made impossible. In normal use, each time the container 10 is to be refilled, the cover 12 is removed and the several parts are cleaned and washed with boiling water. Thereupon, the valve elements are assembled, and after the can is filled with the suitable quantity of cream, the cover is assembled in its position on the container in the way shown in Fig. 1. Thereupon, a tank holding compressed gas is coupled by means of a hose 67 to the outlet member 56 in the way shown in Fig. 4, and gas is admitted into the container, the maximum pressure being checked by a manometer provided on the gas bottle from which the container is charged. As the gas enters into the can through the supply duct 24, it distributes uniformly throughout the whole body of cream and leaves it in a uniformly charged condition. After the charge is completed, the charging hose is removed from the outlet member and the dispensing nipple is seated on the conical end portion 60 of the outlet member and the device is ready to dispense cream.

Dispensing devices of the invention described above are ideally suited not only for converting cream into whipped cream incident to the dispensing operation, but also for converting liquid ice cream mixtures into dispensed semi-solid ice cream, and other similar uses.

Depending on the pressure required in any particular application, dispensing devices may be constructed with different materials having the strength required to withstand the pressure of the compressed gas and the characteristics which facilitate easy and thorough cleaning of the device.

Aluminum and stainless steel have been found to be suitable for the construction of such whipped cream dispensing devices. In the dispensing device shown in Figs. 1 to 5, which was designed for whipping cream, the pressure-proof container 10 is made of drawn aluminum, and all the elements which come into contact with the cream and are under pressure are likewise made of drawn material, such as aluminum. The elements of the valve unit itself, namely, the valve inlet passage of the supply duct 24, the valve casing 26 and the valve outlet member 56 are likewise made of strong corrosion-resisting material, for instance, aluminum. In addition, all the principal elements of the device which come into contact with cream are of simple cylindrical form and readily accessible for cleaning.

In Fig. 5 is shown another form of valve arrangement of the invention. A valve casing 26—A having a valve opening 31 which is closed by the valve member 34, is held in the closed position by a biasing spring 36, and has a stem 35—A extending through the valve opening 31 into the valve chamber so as to open the valve when the stem 35—A is moved inwardly against the action of its biasing spring 36. The valve stem 35—A is arranged to be actuated by an operating rod 45—A, which is slidably mounted within the opening of a valve closure member 40—A which is held clamped against the opening of the upper neck portion 44—A of the valve chamber casing 26—A by a clamping collar 42—A, in a way similar to the arrangement of Fig. 1.

In accordance with the invention, penetration of liquid from the valve chamber 32—A into the space within the valve closure member 40—A is made impossible by a special sealing member 41—A, the periphery of which is held clamped between facing clamping portions of the valve closure member 40—A and the valve casing 26—A. In the form of valve arrangement shown in Fig. 5, the clamped peripheral portion of the sealing member 41—A forms a relatively hard flange seated around the neck portion 44—A of the valve casing 26—A extending from the flexible cup-shaped diaphragm portion forming a gas and liquid tight barrier between the cooperating facing end surface portions of the valve stem 35—A and its operating rod 45—A.

As shown in Fig. 5, the central element of the cup-shaped diaphragm of the sealing member 41—A is likewise thickened and made hard enough so that the downward pressure exerted by the operating rod 45—A when actuating the valve stem 35—A to its open position does not substantially compress the interposed portion of the sealing member 41—A separating them. The cup-shaped formation of the sealing member 41—A provides thus a flexible junction between its central and outer portions which are exposed to compression forces, and the flexible intermediate portion of the sealing member does not impede the movement of the operating rod 45—A when it is actuated to open the valve or to release the valve stem to the closed position.

The sealing member 41—A may be made of rubber and its thickened portions may be hardened, for instance, by vulcanizing. Other flexible materials, such as Neoprene, or synthetic rubber materials may be used for such sealing member.

The neck portion 44—A of the valve casing is shaped so as to form a relatively elongated guide opening for guiding the upper portion of the valve stem 35—A which is actuated by the operating rod 45—A to open the valve. The valve structure of Fig. 5 may be readily taken apart for cleaning and may be readily assembled with the same ease as the valve structure of Fig. 1.

In Fig. 6 is shown a modified form of valve unit comprising a valve casing 74 having an outlet passage portion 75 provided with an outwardly threaded surface to which the outlet member 78 may be coupled by means of a coupling collar 79, the outlet member 78 having a conical junction coupling surface 80 fitting a similar conical coupling surface of the casing outlet passage 75. This arrangement of the valve unit eliminates internally threaded surfaces from all small bore passages of the valve casing. For cleaning purposes, the valve outlet member 78 may be readily uncoupled by unscrewing its coupling collar 79 and removing it from the valve casing 74.

The modified form of discharge nozzle 82, shown in Fig. 6, has a longitudinal passage 83 communicating with the longitudinal passage of the outlet member 78 and a transverse bore 84 in which is tightly seated a decorator nipple 85. The decorator nipple 85 is provided with a longitudinal outlet bore 86 and a crossing transverse bore 87 which is aligned with the nozzle passage 83 for discharging whipped cream from the nozzle passage 83 into the decorator outlet 69 of the decorator nipple 85. The interfitting surfaces of the decorator nipple 85 and the nozzle bore 84 are of conical shape so that when the outlet nipple 85 is mounted in its position and locked in place by a cap nut 88 over an interposed packing washer 89, the bores 86, 87 are tightly sealed so as to force discharged matter into the outlet slits 69 of the decorator nipple 85.

This arrangement of the discharge nozzle 82 and the decorator nipple 85 enables easy dismantling of the complementary parts and all their passages which come in contact with the discharged substance are fully exposed so as to enable their easy and thorough cleaning.

In Fig. 7 is shown another way for coupling the outlet member 78 to the valve casing of such dispensing device. It comprises a valve casing 90 having a threaded upper end portion 91 and clamping collar 42 which clamps thereto the valve closure 40 as well as a mounting collar 92 overlapping the outlet passage 93 of the valve casing. The side of the mounting collar 92 facing the valve outlet passage 93 is provided with a threaded hole 94 in which is mounted the threaded outer surface of an outlet member 95 which has a conical seating surface 96 arranged similar to the conical seating surface of the valve member of Fig. 6, so that by screwing in the valve member 95 in the threaded hole 94 of the mounting collar 92, the valve outlet member 95 is tightly coupled to the outlet passage 93 of the valve casing.

The modification of Fig. 8 is similar to that of Fig. 7, except that instead of a mounting collar, an L-shaped mounting lug 97, which is clamped to the valve casing 90 by the clamping collar 42 of the closure member, it utilized as a mounting seat for the outlet member 95.

In Figs. 9 to 11 is shown an exemplification of a dispensing device of the invention in which the principal parts are made of sheet material in a form which lends itself for manufacturing on a mass production basis. It comprises a cylindrical can-shaped container 100 to which a bottom member 101 is tightly secured as by a welding or crimping joint. The upper edge of the can 100 is reinforced by a rim ring 102 having a flange 103 forming with the upper edge of the can 100 a channel shaped to receive a packing ring 104 of suitable sealing material, such as rubber. The rim ring 102 may be stamped as an integral part of the can 100 or joined thereto by crimping, fusing or welding.

The can is closed by a detachable cover 105 having a rim 106 provided with a flange 107 shaped for detachable clamping engagement with the flange 103 of the can 100. As shown in Fig. 10, the detachable clamping engagement between the flanges 103 and 104 is obtained by providing the interfitting flanges with interengaging sets of castellations 103A and 107A, respectively, arranged so that the castellations on one flange fit the gaps formed between the adjacent castellations on the other flange. The cover is mounted on the can by aligning the castellations of its flange 107 opposite the gaps of the castellations of the can flange 107 and turning the cover relatively to the can to interlock the two sets of castellations. By giving the horizontally facing interengaging castellation surface portions a slight pitch, the turning motion of the cover 105 relatively to the can body 100 will automatically tighten the cover in its position over the sealing ring 104 and secure a tight seal between the cover 105 and the can 100.

The central portion of the cover 105 is provided with a re-entrant cylindrical portion 110 having a flange 111 in which is tightly seated a cylindrical neck portion 112 likewise of sheet metal having an inward flange 113. A valve seat member 116 provided with a flanged valve opening 117, and a packing ring 118 held on the underside of the valve seat 116 are clamped against the flange 113 of the neck portion 112 by a coupling flange 120 of a cylindrical valve casing 121 extending above the valve seat 116, the interengaging surfaces of the casing flange 120 and the neck portion 112 having suitable interlocking clamping projections, for instance, threaded surfaces. The valve opening is shown closed by a valve member 124 having an upwardly projecting stem 124 and being biased against the valve seat 116 by a spring 126 which is mounted between the underside of the valve member 124 and the flange 111 of the re-entrant cover portion 110.

The valve opening with the cooperating portions of the valve seat 124 and the valve stem 125 are shaped and designed in the same way as the corresponding parts of the device of Figs. 1 and 2. The valve stem 125 is shown actuated by a hollow valve rod 129 which is longitudinally guided by a cylindrical closure member 130, having a flange 131 interlockingly engaging the valve casing 121 and clamping a packing ring 132 to an upper flange 133 of the valve casing. The upper end of the closure member 130 has an inwardly flanged portion 136 which serves as a guide and stop for the valve rod 129. The operating rod 129 has a longitudinal discharge passage 140 and its lower end portion 128 forms a seating surface engaging the upper surface 141 of the valve stem 125 so that by pushing the operating rod in downward direction against the biasing action of the helical spring 126, the valve stem is actuated to open the valve opening and release charged liquid into the valve casing.

In the forms shown in Figs. 9 and 10, the interengaging surface portions of the operating rod 129 and the valve stem 141 are shaped to form conical junction surfaces providing radial passages 144 through which an expanded frothy mass discharged into the valve casing 121 is expelled into the discharge passage 140 of the valve rod 129 and therethrough to the exterior. With this arrangement, a liquid, such as cream, charged with gas, and stored in the can 100, may be discharged as whipped cream through the passage 140 of the valve rod 129 by merely pressing downwardly the valve rod so as to actuate the valve stem 125 to gradually open the valve in a way explained in connection with Figs. 1 and 2.

To facilitate the actuation of the operation rod 129, it is provided with an outlet nozzle 145 which is clamped over a packing ring 146 to the end of the hollow valve rod 140, for instance, by threaded engagement with the valve rod, the nozzle 145 being provided with two finger grips 147 for actuating the valve rod 129 to open the valve and discharge whipped cream through the decorator outlet 148 of the nozzle 145.

A dispensing device of the type shown in Figs. 9 and 10 may be made of sheet material, such as stainless steel, or tinned sheet metal, of the type used for making milk cans.

In Fig. 12 is shown another form of a device of the type shown in Figs. 9 and 10. Its cover 105A is provided with a cylindrical neck portion 151 having an inwardly bent flange 152. A valve casing 155 clamps valve seat member 116 with its packing ring 118 against the neck flange 152 by a flange 154 which is clampingly interlocked with the outer surface of the cover neck 151, as by threads. The upper portion of the valve casing 155 forms a cylindrical closure portion 156 serving as a guide and stop for the hollow discharge-passage operating rod 129. The helical valve biasing spring 126 is held in its position by having inwardly projecting arms 158 of a collar member 159 secured, as by welding, to the cover 105A. The packing ring 132 for the valve rod is held in place by a cylindrical spacing member 160 which fits into the interior of the valve casing 155 so that when the valve casing 155 is mounted on the neck 151 of the cover, the packing washer 132 of the valve seat member and the packing washer 132 of the actuating rod are tightly clamped in place. Detachable clamping engagement between the cooperating surface of the cover neck 151 and the casing flange 154, as well as between the other clampingly engaged portions, may be secured either by providing suitable interengaging castellations or by providing suitably threaded surfaces. The outer surfaces of the casing interengaging elements may be knurled or provided with other suitable grip projections so as to facilitate un-tightening and tightening the elements in their operating positions.

In Figs. 13 and 14 is shown another dispensing device exemplifying the invention. It comprises a container 210 having a threaded neck portion which is tightly closed by a suitable cover 212 and a packing ring 213 so as to withstand the pressure of a compressed gas with which the liquid is charged. The cover may be provided with a supporting flange 214 for mounting the vessel on the slanted wall 215 of a refrigerated compartment which maintains the contents of the vessel at the required temperature.

The cover 212 is provided with an upwardly projecting tubular outlet 216 having a downward extension 217 of reduced diameter in which is seated the flanged upper end 218 of a downwardly protruding draw tube 219 having a telescopically mounted extension 220 which may be shaped to reach the lowest level at the bottom of vessel 210.

A valve inlet casing 225 is tightly coupled to the discharge outlet 216, through the threaded engagement of the downward casing extension with inner walls of the outlet 216, packing washers 227, 228 securing tight seals at the junctions of the passage extending from the draw tube 219 to the valve inlet compartment 229.

A valve casing 230 provided with a discharge opening 231 and a valve inlet opening 232 having a valve seat 233 facing the inlet compartment 229 is tightly coupled to the inlet casing 225 through the threaded engagement of the interfitting wall portions and a packing washer. A valve member 234 mounted to face the valve seat 233 has a stem 235 extending through the valve opening 232 into the chamber 236 of the valve casing 230. The valve is shown suitably biased to its closed position, as by a spring 239, and a seating ring 238 of tight compressible material clamped over the valve seat 233 of the valve casing 230 secures a tight closure of the valve opening 232 when the valve 234 is held pressed against the valve seat 233.

A valve closure member 242 having a threaded engagement with an interfitting portion of the valve casing 230 serves as a guide for a valve operating rod 243 having an inwardly projecting tapered member 244 which engages the projecting end of the valve stem, so that downward pressure on the actuating 243 opens the valve 234. A knob 249, or any other conventional grip means, may be used for actuating the valve operating rod 243.

A suitably shaped discharge spout or nozzle 250 is provided with a flanged inlet end 251 which is mounted over the valve discharge opening 231 by means of a coupling ring 252 rotatably mounted on the cylindrical surface of the valve casing 230. A clamping collar 253 with a grip flange 254 seated over the flanged inlet end 251 of the nozzle 250 is threadedly mounted in an opening of the coupling 252 so as to permit tight coupling of the nozzle 250 to the discharge opening 231 of the valve by turning the clamping collar 253 until the nozzle flange 251 has a tight connection with the valve opening.

The coupling collar is also provided with another tapped hole for receiving a threaded nipple 261 of a twin member housing an inwardly opening check valve 262 and an outwardly opening check valve 263. The inner conical end of the twin nipple 261 engages a cavity 264 in the outer wall of the valve casing so that by turning the check valve twin 261, the coupling ring may be clamped either in the position shown in Figs. 13 and 14 in which the discharge nozzle is tightly sealed over the discharge opening 231 of the valve, or in the position in which the inner end of the twin nipple 261 engages the countersunk outer end of the valve opening 231 and establishes a tight coupling conection between the two check valves 262, 263 and the valve chamber 236. With such arrangement, the coupling ring may be readily loosened by unscrewing the twin member 261, whereupon the coupling ring may be rotated along the guideway 266 of the valve casing 230 against which it is held by the packing washer 267 overlying the coupling ring so as to couple either the discharge nozzle 250 or the check valves 262, 263 to the valve chamber 236.

A sealing ring 245 of tight packing material, such as rubber, seated on the tapered valve actuating member 244 and clamped between the interfitting surfaces of the valve casing 230 and the valve closure 242 provides a tightly sealed closure between the valve chamber 236 and the rod guide passage 246 of the valve closure member 242.

Although various materials may be used for making the various elements of the device shown in Figs. 13 and 14, a typical whipped cream dispensing device exemplifying the invention, of the type shown in Figs. 13 and 14, comprises a pressure-proof container 210 of drawn aluminum, a cover 212 of cast aluminum, and the draw tubes 219 and 220 as well as the dispensing nozzle 250 also of drawn aluminum. The elements of the valve unit itself, namely, the valve inlet casing 225, the valve casing 230 and the valve member 234 as well as the actuating rod 244 are made of a strong, corrosion-resisting material, such as stainless steel, all these parts being readily machined to accurate dimenions by simple lathe operations.

In normal operation, as a part of a fountain, the container may be filled with a quantity of the liquid, such as cream, leaving above the level of the liquid a space for the compressed gas. To dispense cream, the valve actuating rod 243 is pressed downwardly so as to move the valve 234 in downward direction against the internal pressure of the gas which, even without the assistance of the spring 239, is sufficient to keep the valve 234 tightly sealed against its seating surface when in normal closed position. The downward movement of the valve 234 brings the tapered portion of the valve stem into the opening 222 and forms with the adjacent walls of the opening an annular expansion nozzle opening which is gradually enlarged as the valve stem moves inwardly. As the valve opens, the cream which is charged with the compressed gas discharges through the gradually enlarging expansion nozzle opening and expands in the valve chamber 236, breaking down the cream particles in the course of the expansion into a fluffy, stable frothy foam which is expelled through the discharge opening 231 and the passage through the discharge nozzle 230. A suitable decorator nozzle may be attached to the end of the discharge nozzle 230 for giving the discharge froth a desired decorative shape.

By making the upwardly projecting portion of the valve stem 235 with a suitably tapered surface, the width of the opening through which the compressed body of cream charged with the gas is discharged is only gradually increased. As a result, the rate at which the frothy conversion product is discharged from the discharge nozzle may be easily regulated, and the discharge of the whipped froth formed by the liquid is only gradually started. An explosion-like discharge of a large mass of whipped cream in the course of an abrupt dispensing operation is prevented by narrowing the gap formed between the side walls of the valve inlet passage 229 of the inlet casing 225 and the facing walls of the valve member 235, so that when the valve stem is pressed sufficiently far down, it reduces the gap through which the body of charged cream may reach the expansion chamber 236 of the valve casing 230. By suitably proportioning the size and the configuration of the inlet passage 229, the outlet passage 231 and the valve 234 with its valve stem 235, the downward movement of the actuating rod may be correlated with the rate at which the cream is converted into froth discharged from the valve.

Entrance of charged cream into the upper guide rod channel 246 of the valve closure 242 and contamination of the valve structure is prevented by the tapered shape of the actuating member 244 which, as it moves downwardly to open the valve, automatically presses outwardly the surrounding body of the packing member 245, thus automatically tightening the seal between the packing member and the plunger as well as between the walls of the valve casing between which it is clamped. Entry of whipped cream into the space above the washer 245 and into crevices surrounding the washer notwithstanding the large pressure in the expansion chamber 236 is thus positively prevented.

All the elements of the valve assembly may be readily taken apart and washed with boiling water at the end of the day and cleaned from any remnants of whipped cream. All passages in the valve are simple and straight and may be readily scrubbed with a brush. All the elements are free from crevices from which an incrusted particle of cream cannot be removed, and thus danger of contamination of the cream or milk is eliminated.

In taking apart the valve structure, the valve assembly may be readily removed from the cover by turning it, for instance, by using the check valve unit 264 and the coupling collar as a grip. To take apart the several elements, the valve closure 242 and the valve inlet casing 225 are removed from the valve casing 230, whereupon the packing members 234, 245 as well as the other washers may be removed from their seats. Since packing members are very simple and all joints have simple threads, the packing members may be discarded and replaced by new packing members after each use. Similarly, the coupling ring 252 with its spout 250 and the check valves may be readily taken apart for cleaning.

In normal use, each time the container has to be refilled, the cover 212 is removed and the several parts are cleaned and washed with boiling water. Thereupon, the valve elements and the cover are assembled in the way shown in Fig. 13, except that the check valve twin is placed opposite the opening 231 leading from the valve chamber 236 of the valve casing 230. The can is then filled with a suitable quantity of cream and the cover is tightly sealed on the can 210. Thereupon, a tank holding compressed gas is coupled by means of a hose to the charging nozzle equipped with the inlet valve 262. The can 210 is then charged with gas by merely pressing down the grip to open the valve until the outlet check valve 263, which is adjusted to open at a predetermined maximum pressure, opens and indicates that the can 210 has been charged to the required pressure. Alternatively, the check valve 263 of the valve twin may be replaced with a gauge for indicating the pressure of the charged gas admitted to the can during the charging process, or a triplet coupling may be used to provide the permanent mounting for the gauge. As the gas enters into the can through the draw tube 220 in downward direction, it distributes uniformly throughout the whole body of cream and leaves it in uniformly charged condition. After the charge is completed, the valve is released, the gas tank is closed and detached from the inlet opening of the check valve 262, whereupon the check valve twin is unscrewed from its connection to the valve casing opening 231 and the whole coupling ring is returned to the position shown in Figs. 13 and 14 in which it is then locked by tightening the valve twin unit 264 to establish a tight connection between the flange 251 of the discharge nozzle 250 with the opening 231 of the valve casing.

Gas cannot escape from the assembled container notwithstanding the relatively high inner pressure even if the cover 212 is, for sake of cheapness, made of cast material, because the packing members 245, 267, 238, 234, 228 provide tight joints of the inherently tight threaded elements of the valve structure itself, which completes its tight connection to the draw tube by the tight joint between the upper flange 227 of the draw tube 218 with the projecting end 226 of the valve casing 225.

In the modification shown in Fig. 15, the draw tube is made an integral part of the valve socket, for instance, by casting a cover 260, similar to the cover 212 of Fig. 13, around a steel tube 261 having an upper portion 262 shaped to form the valve inlet chamber 263 on which the valve casing 264 is mounted in a way analogous to that shown in Fig. 13.

In Fig. 16 is shown another exemplification of the invention. It comprises a valve inlet casing 70, which supports a valve assembly similar in construction to the valve assembly of Fig. 13, and has its downward extension 271 made in the form of a cylindrical plug member 273 which fits into a hole 274 provided in a projecting coupling member 275 which is coupled to the vessel outlet 276 so as to establish a tight connection between the passage 278 in the coupling member 272 and the adjoining draw tube 277. The plug member 273 is provided with a hole which communicates with the passage 278 leading from the draw tube 277 for supplying charged cream under pressure to the valve assembly and producing whipped cream by means of the valve unit in the way described in Fig. 13. The valve assembly including the valve inlet casing 271 may be tightly locked in place by means of a cylindrical lock nut 279. The upper end of the passage 278 of the coupling member 275 is provided with a valve twin 282 similar to the valve twin 264 shown in Figs. 13 and 14 and serves as a charging valve connection as well as a safety valve connection to the vessel.

With the device of the invention, the can may at any time be opened for removing the cream, without the danger that the charged body of the cream will be abruptly discharged, by inverting the can, then letting out the compressed gas which collects in the top of the inverted can by simply opening the valve, whereupon the can may be opened in upright position.

In each of the exemplifications of the invention, the creamy charged liquid supplied under pressure to the valve opening is converted into a frothy, stable, foamy mass by expanding the charged compressed gas-holding liquid through an expansion nozzle formed by the walls of the valve opening and a valve member extending through the valve opening. The surface of the valve opening and the cooperating surface of the valve member which successively faces the valve opening are shaped to gradually increase the valve opening which effects the conversion of the charged liquid into a froth as the valve is moved away from the valve seat. The controlled shape of the effective expansion nozzle opening assures the required consistency of the frothy mass formed by the expansion process in all positions of the valve member.

By correlating the shape of the valve inlet passage with the shape of the valve member portion extending into the inlet passage, the rate at which the compressed charged liquid is supplied to the expansion nozzle is correlated with the corresponding effective expansion nozzle opening so as to secure the required consistency of the frothy expansion product.

Although the exemplifications of the invention described above have been developed to provide a practical whipped cream dispensing device suitable for fountain use by converting a body of liquid cream charged with compressed gas into whipped cream as it is being dispensed, the features of the invention are not limited to whipped cream dispensing devices, but are applicable for many uses, such as dispensing liquid ice cream mixtures, malted liquids or the like. It is accordingly desired that the appended claims be given a broad construction commensurate with the scope of the invention.

I claim:

1. In a dispensing device for converting a fluid charged with a gas under pressure and requiring sanitary handling into a dispensed gas expanded product of increased volume, a valve housing structure having an inlet passage for receiving the fluid, a discharge passage, and an open valve passage connecting said inlet passage to said discharge passage, a valve closure member extending through said valve passage into said discharge passage movable from a valve closing position to open positions, a yieldable sealing member constituting a wall portion of said discharge passage and having a sealing opening with an inwardly facing sealing surface, and an elongated movable actuating member having an exterior sealing surface engaging the sealing surface of said sealing member and movable inwardly through said sealing opening for moving said valve member to an open position while maintaining sealing engagement with said sealing member, successive portions of one of the sealing surfaces of said actuating member that some into engagement with the facing sealing surface of said sealing member when the actuating member is moved inwardly being of increasing peripheral length and so shaped as to increase its sealing engagement between said sealing surfaces in the inward position of said actuating member.

2. In a dispensing device for converting a fluid charged with a gas under pressure and requiring sanitary handling into a dispensed gas expanded product of increased volume, a valve housing structure having an inlet passage for receiving the fluid, a discharge passage, and an open valve passage connecting said inlet passage to said discharge passage, a valve closure member extending through said valve passage into said discharge passage movable from a valve closing position to open positions, a yieldable sealing member constituting a wall portion of said discharge passage and having a sealing opening with an inwardly facing sealing surface, and an elongated movable actuating member having an exterior sealing surface engaging the sealing surface of said sealing member and movable inwardly through said sealing opening for moving said valve member to an open position while maintaining sealing engagement with said sealing member, the surface of said valve passage and the cooperating surface of said valve member which successively faces said valve passage when said valve member is gradually moved away from its closed position being shaped to form walls of a gradually widening expansion nozzle causing an expansion of the charged fluid passing through said valve passage into a gas expanded product of increased volume discharged into said discharge passage, successive portions of one of the sealing surfaces of said actuating member that come into engagement with the facing sealing surface of said sealing member when the actuating member is moved inwardly being of increasing peripheral length and so shaped as to increase its sealing engagement between said sealing surfaces in the inward position of said actuating member.

3. In a dispensing device for converting a fluid charged with a gas under pressure and requiring sanitary handling into a dispensed gas expanded product of increased volume, a valve housing structure having an inlet passage for receiving the fluid, a discharge passage, and an open valve passage connecting said inlet passage to said discharge passage, a valve closure member extending through said valve passage into said discharge passage movable from a valve closing position to open positions, a yieldable sealing member constituting a wall portion of said discharge passage and having a sealing opening with an inwardly facing sealing surface, and an elongated actuating member having on its exterior a sealing surface engaging the sealing surface of said sealing member and movable inwardly through said sealing opening for moving said valve member to an open position while maintaining sealing engagement with said sealing member, successive portions of the sealing surfaces of said actuating member that come into engagement with the sealing surface of said sealing member when the actuating member is moved inwardly being of increasing peripheral length and so shaped as to increase its sealing engagement between said sealing surfaces in the inward position of said actuating member.

4. In a dispensing device for dispensing fluid charged with a gas under pressure: a valve housing structure comprising a discharge passage, a fluid supply duct portion having an open end and a valve seat wall including a seat wall portion having an open valve passage connecting the space of said supply duct portion to said discharge passage; a valve closure member having a stem extending through said valve passage and an enlarged closure element held against the side of said seat wall portion facing said supply duct portion for closing said valve passage; said valve closure member being actuable to move to an open position in which its closure element is spaced from said seat wall portion; the seat wall portion bordering said valve passage being separable from the adjacent portions of said seat wall along said fluid supply duct portion being detachably clamped to the adjacent portions of the valve housing structure and being so arranged and shaped as to hold said intermediate seat wall portion in its interfitting sealing position within said seat wall.

5. In a dispensing device for dispensing fluid charged with a gas under pressure: a valve housing structure comprising a discharge passage, a fluid supply duct portion having an open end and a valve seat wall including a substantially rigid intermediate seat wall portion having an open valve passage connecting the space of said supply duct portion to said discharge passage; a valve closure member having a stem extending through said valve passage and an enlarged closure element held against the side of said seat wall portion facing said supply duct portion for closing said valve passage; said valve closure member being actuable to move to an open position in which its closure element is spaced from said seat wall portion; the exterior surface of said stem and the facing surface of said valve passage being shaped to form during the initial part of the opening motion of the closure member substantially parallel border surfaces of a relatively elongated flow passage of restricted cross section permitting entry of only negligibly small traces of fluid from said inlet portion into said flow passage to effect in the course of the further opening motion of the closure member a gradual shortening of the restricted elongated flow passage and its conversion into an expansion nozzle of increasing cross section widening in the direction of the flow so as to gradually increase the rate at which charged fluid entering said flow passage is converted into a gas expanded body flowing into said discharge passage; a yieldable packing washer surrounding said stem having a peripheral region interposed between said closure element and the facing portion of said seat wall so as to form a valve seal; the intermediate seat wall portion being separable from the adjacent portions of said seat wall along interfitting sealing surfaces; said washer being held in its operative position by said intermediate seat wall portion said fluid supply duct portion being detachably clamped to the adjacent portions of the valve housing structure and being so arranged and shaped as to hold said intermediate seat wall portion in its interfitting sealing position within said seat wall.

6. In a dispensing device for dispensing fluid charged with a gas under pressure: a valve housing structure comprising a discharge passage, a fluid supply duct portion having an open end and a valve seat wall including a substantially rigid intermediate seat wall portion having an open valve passage connecting the space of said supply duct portion to said discharge passage; a valve closure member having a stem extending through said valve passage and an enlarged closure element held against the side of said seat wall portion facing said supply duct portion for closing said valve passage; said valve closure member being actuable to move to an open position in which its closure element is spaced from said seat wall portion; a yieldable packing washer surrounding said stem having a peripheral region interposed between said closure element and the facing portion of said seat wall so as to form a valve seal; the intermediate seat wall portion being separable from the adjacent portions of said seat wall along generally conical interfitting sealing surfaces; said washer being held in its operative position by said intermediate seat wall portion and being removable therewith said fluid supply duct portion being detachably clamped to the adjacent portions of the valve housing structure and being so arranged and shaped as to hold said intermediate seat wall portion in its interfitting sealing position within said seat wall.

7. In a dispensing device for dispensing fluid charged with a gas under pressure: a valve housing structure comprising a discharge passage, a fluid supply duct portion having an open end and a valve seat wall including a substantially rigid intermediate seat wall portion having an open valve passage connecting the space of said supply duct portion to said discharge passage; a valve closure member having a stem extending through said valve passage and an enlarged closure element held against the side of said seat wall portion facing said supply duct portion for closing said valve passage; said valve closure member being actuable to move to an open position in which its closure element is spaced from said seat wall portion; the exterior surface of said stem and the facing surface of said valve passage being shaped to form during the initial part of the opening motion of the closure member substantially parallel border surfaces of a relatively elongated flow passage of restricted cross section permitting entry of only negligibly small traces of fluid from said inlet portion into said flow passage to effect in the course of the further opening motion of the closure member a gradual shortening of the restricted elongated flow passage and its conversion into an expansion nozzle of increasing cross section widening in the direction of the flow so as to gradually increase the rate at which charged fluid entering said flow passage is converted into a gas expanded body flowing into said discharge passage; a yieldable packing washer surrounding said stem having a peripheral region interposed between said closure element and the facing portion of said seat wall so as to form a valve seal; said intermediate seat wall portion being separable from the adjacent portions of said seat wall and having a tubular flange extension interposed between said washer and the edges of said valve passage facing said valve closure element said supply duct portion being detachably clamped to the adjacent portions of the valve housing structure and being so arranged and shaped as to hold said intermediate seat wall portion in its interfitting sealing position within said seat wall.

8. In a dispensing device for dispensing fluid charged with a gas under pressure: a valve housing structure comprising a discharge passage, a fluid supply duct portion having an open end and a valve seat wall including a substantially rigid intermediate seat wall portion having an open valve passage connecting the space of said supply duct portion to said discharge passage; a valve closure member having a stem extending through said valve passage and an enlarged closure element held against the side of said seat wall portion facing said supply duct portion for closing said valve passage; said valve closure member being actuable to move to an open position in which its closure element is spaced from said seat wall portion; the exterior surface of said stem and the facing surface of said valve passage being shaped to form during the initial part of the opening motion of the closure member substantially parallel border surfaces of a relatively elongated flow passage of restricted cross section permitting entry of only negligibly small traces of fluid from said inlet portion into said flow passage to effect in the course of the further opening motion of the closure member a gradual shortening of the restricted elongated flow passage and its conversion into an expansion nozzle of increasing cross section widening in the direction of the flow so as to gradually increase the rate at which charged fluid entering said flow passage is converted into a gas expanded body flowing into said discharge passage; a yieldable packing washer surrounding said stem having a peripheral region interposed between said closure element and the facing portion of said seat wall so as to form a valve seal; said intermediate seat wall portion being separable from the adjacent portions of said seat wall and having a tubular flange extension interposed between said washer and the edges of said valve passage facing said valve closure element; the outer surface of said flange extension being shaped to form a detent engaging and retaining said washer on said intermediate wall portion said fluid supply duct portion being detachably clamped to the adjacent portions of the valve housing structure and being so arranged and shaped as to hold said intermediate seat wall portion in its interfitting sealing position within said seat wall.

9. In a dispensing device for dispensing fluid charged with a gas under pressure: a fluid supply duct having an open end; a valve housing structure comprising a discharge passage, a valve seat wall including a substantially rigid intermediate seat wall portion having an open valve passage connecting the space of said supply duct to said discharge passage; a valve closure member having a stem extending through said valve passage and an enlarged closure element held against the side of said seat wall portion facing said duct for closing said valve passage; said valve closure member being actuable to move to an open position in which its closure element is spaced from said seat wall portion; a yieldable packing washer surrounding said stem having a peripheral region interposed between said closure element and the facing portion of said seat wall so as to form a valve seal; the intermediate seat wall portion being separable from the adjacent portions of said seat wall; said intermediate seat wall portion having a tubular flange extension interposed between said washer and the edges of said valve passage facing said valve closure element; said supply duct and said valve housing structure having interengaging portions joining said valve housing structure and said duct into a substantially gas-tight passage and clamping said packing washer and said intermediate seat wall portion in their operating positions.

10. In a dispensing device for dispensing fluid charged with a gas under pressure: a fluid supply duct having an open end; a valve housing structure comprising a discharge passage, a valve seat wall including a substantially rigid intermediate seat wall portion having an open valve passage connecting the space of said supply duct to said discharge passage; a valve closure member having a stem extending through said valve passage and an enlarged closure element held against the side of said seat wall porton facing said duct for closing said valve passage; said valve closure member being actuable to move to an open position in which its closure element is spaced from said seat wall portion; a yieldable packing washer surrounding said stem having a peripheral region interposed between said closure element and the facing portion of said seat wall so as to form a valve seal; the intermediate seat wall portion being separable from the adjacent portions of said seat wall along generally conical interfitting sealing surfaces; said supply duct and said valve housing structure having interengaging portions joining said valve housing structure and said duct into a substantially gas-tight passage and clamping said packing washer and said intermediate seat wall portion in their operating positions.

11. In a dispensing device for dispensing fluid charged with a gas under pressure: a valve housing structure comprising a discharge passage, a valve inlet portion and a valve seat wall including a seat wall portion having an open valve passage connecting the space of said inlet portion to said discharge passage; a valve closure member having a stem extending through said valve passage and an enlarged closure element held against the side of said seat wall portion facing said inlet portion for closing said valve passage; said valve closure member being actuable to move to open positions for increasing the flow cross section of the valve passage; a yieldable sealing member held in a wall portion of said discharge passage having a sealing opening with an inwardly facing sealing surface; and an elongated actuating member having an exterior sealing surface extending through said sealing opening along its sealing surface and movable for actuating said valve closure member to an open position, the facing peripheral sealing surfaces of said actuating member and said sealing member being shaped to increase in peripheral length for gradually increasing the sealing engagement between said sealing surfaces as the valve closure member is actuated to increase the cross section of the valve passage.

12. In a dispensing device for dispensing fluid charged with a gas under pressure: a valve housing structure comprising a discharge passage, a valve inlet portion and a valve seat wall including a substantially rigid seat wall portion having an open valve passage connecting the space of said inlet portion to said discharge passage; a valve closure member having a stem extending through said valve passage and an enlarged closure element held against the side of said seat wall portion facing said inlet portion for closing said valve passage; said valve closure member being actuable to move to an open position in which its closure element is spaced from said seat wall portion; the exterior surface of said stem and the facing surface of said valve passage being shaped to form during the initial part of the opening motion of the closure member substantially parallel border surfaces of a relatively elongated flow passage of restricted cross section permitting entry of only negligibly small traces of fluid from said inlet portion into said flow passage to effect in the course of the further opening motion of the closure member a gradual shortening of the restricted elongated flow passage and its conversion into an expansion nozzle of increasing cross section widening in the direction of the flow so as to gradually increase the rate at which charged fluid entering said flow passage is converted into a gas expanded body flowing into said discharge passage; a yieldable packing washer surrounding said stem having a peripheral region interposed between said closure element and the facing portion of said seat wall so as to form a valve seal; a yieldable sealing member held in a wall portion of said discharge passage having a sealing opening with an inwardly facing sealing surface; an elongated actuating member having an exterior sealing surface extending through said sealing opening along its sealing surface and movable for actuating said valve closure member to an open position, the facing peripheral sealing surfaces of said actuating member and said sealing member being shaped to increase in peripheral length for gradually increasing the sealing engagement between said sealing surfaces as the valve closure member is actuated to increase the cross section of the valve passage.

13. In a dispensing device for dispensing fluid charged with a gas under pressure: a fluid supply duct having an open end; a valve housing structure comprising a discharge passage, a valve seat wall including a substantially rigid seat wall portion having an open valve passage connecting the space of said supply duct to said discharge passage; a valve closure member having a stem extending through said valve passage and an enlarged closure element held against the side of said seat wall portion facing said duct for closing said valve passage; said valve closure member being actuable to move to an open position in which its closure element is spaced from said seat wall portion; the exterior surface of said stem and the facing surface of said valve passage being shaped to form during the initial part of the opening motion of the closure member substantially parallel border surfaces of a relatively elongated flow passage of restricted cross section permitting entry of only negligibly small traces of fluid from said inlet portion into said flow passage to effect in the course of the further opening motion of the closure member a gradual shortening of the restricted elongated flow passage and its conversion into an expansion nozzle of increasing cross section widening in the direction of the flow so as to gradually increase the rate at which charged fluid entering said flow passage is converted into a gas expanded body flowing into said discharge passage; a yieldable packing washer surrounding said stem having a peripheral region interposed between said closure element and the facing portion of said seat wall so as to form a valve seal; the seat wall portion bordering said valve opening passage being separable from the adjacent portions of said seat wall; a yieldable sealing member held in a wall portion of said discharge passage having a sealing opening with an inwardly facing sealing surface; an elongated actuating member having an exterior sealing surface extending through said sealing opening along its sealing surface and movable for actuating said valve closure member to an open position, the facing peripheral sealing surfaces of said actuating member and said sealing member being shaped to increase in peripheral length for gradually increasing the sealing engagement between said sealing surfaces as the valve closure member is actuated to increase the cross section of the valve passage; said supply duct and said valve housing structure constituting axially aligned units having axially aligned interengaging portions joining said valve housing structure and said duct into a substantially gas-tight passage and clamping said packing washer and said seat wall portion in their operating position.

14. In a dispensing device for converting a fluid charged with a gas under pressure and requiring sanitary handling into a dispensed gas expanded product of increased volume, a fluid supply duct, a valve housing structure having a discharge passage and valve seat wall including a substantially rigid separable intermediate wall portion sealingly engaging the surrounding seat wall region along generally conical interfitting surfaces and having an open valve passage connecting said supply duct to said discharge passage, an elongated valve closure member extending through said valve passage and having an enlarged inner closure element biased to a valve closing position against the side of said seat wall facing said duct said valve closure member being actuable to move to an open position in which its closure element is spaced from said seat wall, a yieldable packing washer surrounding said stem and inteposed between said seat wall and said valve member, said intermediate wall portion having a tubular flange extension forming part of the walls of said valve passage and interposed between said washer and the edges of said valve passage facing said valve member, the outer surface of said flange extension being shaped to form a detent engaging and retaining said washer on said intermediate wall portion, said supply duct and said valve structure having interengaging portions joining said valve structure and said duct into a substantially gas tight passage and clamping said intermediate wall portion in its operating position on said seat wall.

15. In a dispensing device for converting a fluid charged with a gas under pressure and requiring sanitary handling into a dispensed gas expanded product of increased volume, a fluid supply duct, a valve housing structure having a discharge passage and valve seat wall including a substantially rigid separable intermediate wall portion sealingly engaging the surrounding seat wall portion along generally conical interfitting surfaces and having an open valve passage connecting said supply duct to said discharge passage, an elongated valve closure member extending through said valve passage and having an enlarged inner closure element biased to a valve closing position against the side of said seat wall facing said duct, said valve member being actuable to move to an open position in which its closure element is spaced from said seat wall, the surface of said valve passage and the facing surface of said closure member being shaped to form during the initial part of the opening motion of the closure member substantially parallel border surfaces of a relatively elongated passage of restricted cross section permitting entry of only negligibly small traces of fluid into said valve passage, and to effect in the course of the further opening motion of the closure member a gradual shortening of the restricted elongated passage and its conversion into a gradually longer expansion nozzle of increasing cross section widening in the direction toward said discharge passage so as to gradually increase the rate at which charged fluid entering said valve passage is converted into a gas expanded body flowing into said discharge passage, a yieldable packing washer surrounding said stem and interposed between said seat wall and said valve member, said intermediate wall portion having a tubular flange extension forming part of the walls of said valve passage and interposed between said washer and the edges of said valve passage facing said valve member, said supply duct and said valve structure having interengaging portions joining said valve structure and said duct into a substantially gas tight passage and clamping said packing washer and intermediate wall portion in its operating position on said seat wall.

16. In a dispensing device for converting a fluid charged with a gas under pressure and requiring sanitary handling into a dispensed gas expanded product of increased volume, a fluid supply duct, a valve housing structure having a discharge passage and valve seat wall including a substantially rigid separable intermediate wall portion sealingly engaging the surrounding seat wall portion along generally conical interfitting surfaces and having an open valve passage connecting said supply duct to said discharge passage, an elongated valve closure member extending through said valve passage and having an enlarged inner closure element biased to a valve closing position against the side of said seat wall facing said duct, said valve member being actuable to move to an open position in which its closure element is spaced from said seat wall, the surface of said valve passage and the facing surface of said closure member being shaped to form during the initial part of the opening motion of the closure member substantially parallel border surfaces of a relatively elongated passage of restricted cross section permitting entry of only negligibly small traces of fluid into said valve passage, and to effect in the course of the further opening motion of the closure member a gradual shortening of the restricted elongated passage and its conversion into a gradually longer expansion nozzle of increasing cross section widening in the direction toward said discharge passage so as to gradually increase the rate at which charged fluid entering said valve passage is converted into a gas expanded body flowing into said discharge passage, a yieldable packing washer surrounding said stem and interposed between said seat wall and said valve member, said intermediate wall portion having a tubular flange extension forming a part of the walls of said valve passage and inteposed between said washer and the edges of said valve passage facing said valve member, said supply duct and said valve structure having interengaging portions joining said valve structure and said duct into a substantially gas tight passage and clamping said packing washer and intermediate wall portion in its operating position on said seat wall, the outer surface of said flange extension being shaped to form a detent engaging and retaining said washer on said intermediate wall portion.

HARRY PLETMAN.